US012743053B2

(12) United States Patent
Yao et al.

(10) Patent No.: US 12,743,053 B2
(45) Date of Patent: Sep. 22, 2026

(54) SMARTWATCH WITH DETACHABLE CASE AND CLUTCH CROWN MECHANISM

(71) Applicant: Huawei Technologies Co., Ltd., Shenzhen (CN)

(72) Inventors: Yuliang Yao, Xi'an (CN); Shuai He, Shenzhen (CN); Xiaogang Liu, Xi'an (CN); Jie Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 240 days.

(21) Appl. No.: 18/292,607

(22) PCT Filed: Jul. 27, 2022

(86) PCT No.: PCT/CN2022/108099
§ 371 (c)(1),
(2) Date: Jan. 26, 2024

(87) PCT Pub. No.: WO2023/005955
PCT Pub. Date: Feb. 2, 2023

(65) Prior Publication Data

US 2025/0076815 A1 Mar. 6, 2025

(30) Foreign Application Priority Data

Jul. 28, 2021 (CN) ........................ 202110859598.X

(51) Int. Cl.
*G04B 37/06* (2006.01)
*G04B 37/10* (2006.01)
*G04G 17/08* (2006.01)

(52) U.S. Cl.
CPC ............ *G04B 37/06* (2013.01); *G04B 37/10* (2013.01); *G04G 17/08* (2013.01)

(58) Field of Classification Search
CPC ................................ G04B 3/041; G04B 37/10
See application file for complete search history.

(56) References Cited

U.S. PATENT DOCUMENTS 2,237,860 A * 4/1941 Bolle ..................... G04B 37/10 968/339
2014/0169144 A1* 6/2014 Briswalter ............ G04B 37/10 29/896.34

(Continued)

FOREIGN PATENT DOCUMENTS

CH 699020 B1 1/2010
CH 705590 B1 4/2016

(Continued)

OTHER PUBLICATIONS

Translation of EP2579103, Espacenet (Year: 2013).*

*Primary Examiner* — Renee S Luebke
*Assistant Examiner* — Matthew Daniel Hwang
(74) *Attorney, Agent, or Firm* — Conley Rose, P.C.

(57) ABSTRACT

A smartwatch includes case, a crown, a guide rod, and an internal mechanism case. The case is detachably coupled to an outer side of the internal mechanism case. A through hole is disposed on the case. The guide rod is disposed on the internal mechanism case and is opposite the through hole. A stem of the crown extends through the through hole. A knob of the crown is located on a side of the through hole that is distal from the guide rod. The stem is configured such that when the knob is subject to pressure, the stem approaches the guide rod, and when the knob is subject to pulling force, the stem moves away from the guide rod, and when the knob is subject to rotation force, the stem rotates and drives the guide rod to rotate.

20 Claims, 13 Drawing Sheets

(56) References Cited

U.S. PATENT DOCUMENTS

| | | | | |
|---|---|---|---|---|
| 2017/0185048 | A1* | 6/2017 | Yuen | G04G 21/04 |
| 2019/0018369 | A1* | 1/2019 | Vuille | G04B 37/02 |

FOREIGN PATENT DOCUMENTS

| | | | | |
|---|---|---|---|---|
| CN | 208861148 | U | 5/2019 | |
| CN | 208999777 | U | 6/2019 | |
| CN | 209992820 | U | 1/2020 | |
| EP | 2579103 | A2 * | 4/2013 | G04B 37/10 |
| EP | 3185079 | B1 | 6/2017 | |

* cited by examiner

SMARTWATCH WITH DETACHABLE CASE AND CLUTCH CROWN MECHANISM

CROSS-REFERENCE TO RELATED APPLICATIONS

This is a U.S. National Stage of International Patent Application No. PCT/CN2022/108099 filed on Jul. 27, 2022, which claims priority to Chinese Patent Application No. 202110859598.X filed on Jul. 28, 2021. Both of the aforementioned applications are incorporated herein by reference in their entireties.

TECHNICAL FIELD

This application relates to the field of wearable device technologies, and in particular, to a smartwatch.

BACKGROUND

With development of smart wearable devices, smart wearable devices such as smartwatches are increasingly widely used and have increasingly powerful functions. A smartwatch mainly includes a case, an internal mechanism, and a crown. However, for a current smartwatch structure, only a watch band can be conveniently disassembled, and procedures of disassembly and assembly between the internal mechanism and the case are complex, and are difficult to operate. Consequently, a requirement of a user for replacing the case cannot be satisfied.

SUMMARY

A smartwatch is provided, and a case can be conveniently disassembled from an internal mechanism and assembled on the internal mechanism. Therefore, a requirement of a user for replacing the case is satisfied.

A smartwatch is provided, including: a case, a crown, a guide rod, and an internal mechanism case. The case is detachably connected to an outer side of the internal mechanism case. A through hole is disposed on the case. The guide rod is disposed on the internal mechanism case and is opposite to the through hole. The crown includes a knob and a stem, at least a part of the stem passes through the through hole, and the knob is located on a side that is of the through hole and that is away from the guide rod. When the knob is subject to pressure, the stem is configured to move in an axial direction and approach the guide rod; when the knob is subject to pulling force, the stem is configured to move in an axial direction and leave the guide rod; or when the knob is subject to rotation force, the stem is configured to rotate, and drive the guide rod to rotate. The crown may approach or leave the guide rod in the internal mechanism case, and a rotation operation or pressing operation can be implemented through fitting between the crown and the guide rod. When the crown leaves the guide rod and is separated from the internal mechanism case, disassembly or assembly between the internal mechanism case and the case can be implemented. No complex crown disassembly process is needed, and the case can be conveniently disassembled from the internal mechanism and assembled on the internal mechanism. Therefore, a requirement of a user for replacing the case is satisfied.

In a possible implementation, the smartwatch further includes a crown tube. The crown tube is fastened to the case, an inner cavity of the crown tube and the through hole are coaxially disposed, and the stem passes through the inner cavity of the crown tube. A limiting structure is disposed on the crown tube, and the limiting structure is configured to limit a position of the stem when the stem moves in the axial direction and leaves the guide rod, to prevent the stem from being separated from the crown tube.

In a possible implementation, the smartwatch further includes: a spring structure. The spring structure is located between the crown tube and the stem, and the spring structure is configured to provide buffering in a process of pressing and pulling the crown to improve a hand feeling of the user when the user operates the crown.

In a possible implementation, the spring structure is an annular spring. The annular spring includes an annular support part and an opening part. The opening part includes a plurality of annularly arranged elastic parts. Any two adjacent elastic parts are spaced from each other. A middle part of each elastic part is bent in a direction close to the stem.

In a possible implementation, the knob includes a top plate and a side plate, an end that is of the stem and that is away from the guide rod is connected to the top plate, the side plate extends along an edge of the top plate and is disposed around the stem, the side plate, the top plate, and the stem form a groove that is of the knob and that faces the guide rod, and at least a part of the crown tube is located in the groove of the knob.

In a possible implementation, the opening part of the annular spring is located on a side that is of the annular support part and that is away from the guide rod.

In a possible implementation, the spring structure is located on a side that is of the limiting structure and that is away from the guide rod.

In a possible implementation, the smartwatch further includes: a first friction gasket and a second friction gasket. The first friction gasket is located between the crown tube and the knob, and the second friction gasket is located between the limiting structure and the stem.

In a possible implementation, the stem includes a knob fitting part and a guide rod fitting part, and the knob fitting part is fastened to the knob. The knob fitting part is a cylindrical structure facing the guide rod, and an inner wall of the cylindrical structure has an internal thread. The guide rod fitting part includes an external thread part, a limiting and blocking part and a transmission part. The external thread part is located on a side that is of the limiting and blocking part and that is away from the transmission part, and the external thread part is located in the cylindrical structure and threadedly connected to the cylindrical structure. The limiting and blocking part is located between the limiting structure and the guide rod.

In a possible implementation, the opening part of the annular spring is located on a side that is of the annular support part and that is close to the guide rod.

In a possible implementation, the limiting structure is located in a groove of the knob. The spring structure is located on a side that is of the limiting structure and that is close to the guide rod.

In a possible implementation, a rotation limiting part is disposed at an end that is of the stem and that is away from the knob, and a rotation limiting groove is disposed at an end that is of the guide rod and that is close to the through hole. Alternatively, a rotation limiting groove is disposed at an end that is of the stein and that is away from the knob, and a rotation limiting part is disposed at an end that is of the guide rod and that is close to the through hole. When the stem moves in the axial direction, and approaches and touches the guide rod, the rotation limiting part is engaged with the rotation limiting groove. When the rotation limiting part is engaged with the rotation limiting groove, and the knob is subject to the rotation force, the stem is configured to rotate, and drive the guide rod to rotate through engagement between the rotation limiting part and the rotation limiting groove.

In a possible implementation, a driving gear is disposed at an end that is of the stem and that is away from the knob. A driven gear is disposed at an end that is of the guide rod and that is close to the through hole. When the stem moves in the axial direction, and approaches and touches the guide rod, the driving gear meshes with the driven gear. When the driving gear meshes with the driven gear, and the knob is subject to the rotation force, the stem is configured to rotate, and drive the guide rod to rotate via the driving gear and the driven gear.

In a possible implementation, a guide rod groove is disposed at the end that is of the guide rod and that is close to the through hole, and the driven gear is disposed in the guide rod groove.

In a possible implementation, a first guide surface is disposed at an end part of the driving gear. A second guide surface is disposed at an end part of the driven gear.

In a possible implementation, a first friction thread is disposed on an end surface that is of the stem and that is away from the knob, and/or a second friction thread is disposed on an end surface that is of the guide rod and that is close to the through hole.

In a possible implementation, a waterproof groove is disposed around the guide rod, and a sealing ring is disposed in the waterproof groove.

DESCRIPTION OF EMBODIMENTS

Figure 1:
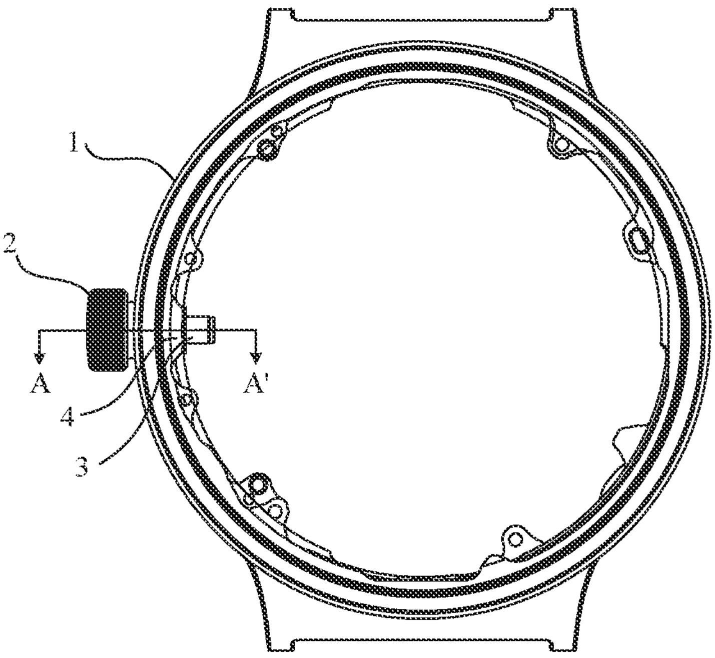
FIG. 1 is a schematic diagram of a partial structure of a smartwatch according to an embodiment of this application.
Figure 2:
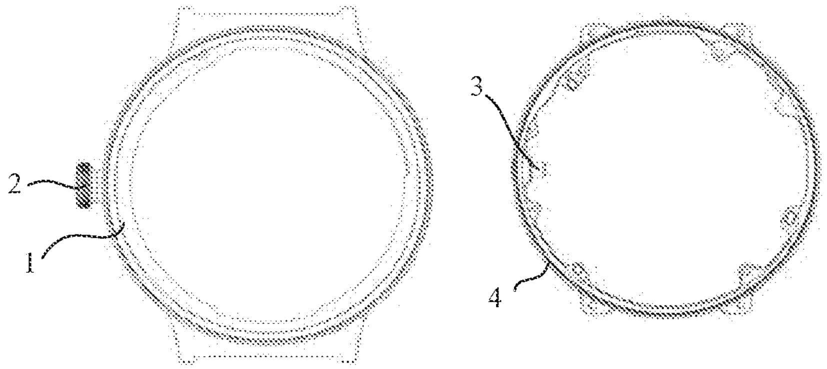
FIG. 2 is a separate schematic diagram of a case and an internal mechanism case in FIG. 1.
Figure 3:
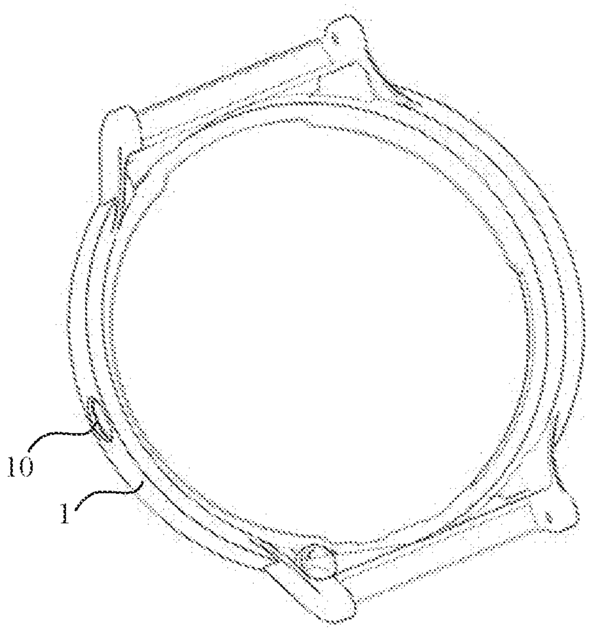
FIG. 3 is a schematic diagram of a case in FIG. 1.
Figure 4:
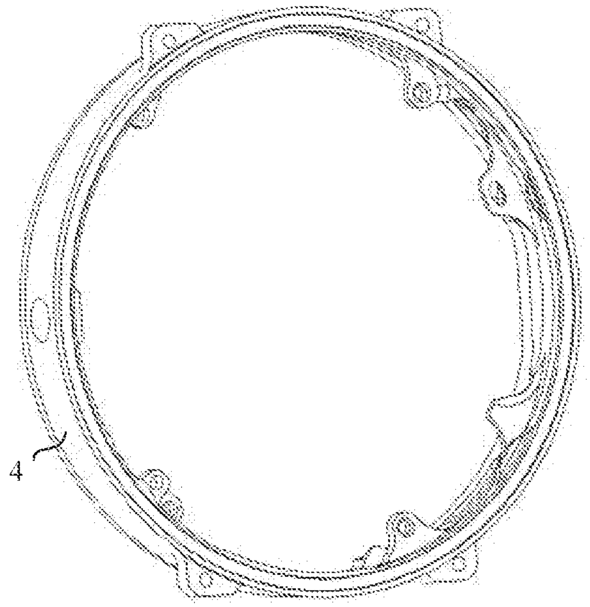
FIG. 4 is a schematic diagram of an internal mechanism case in FIG. 1.

Terms used in implementations of this application are only used to explain specific embodiments of this application, but are not intended to limit this application.

Before embodiments of this application are described, conventional technologies are first described. For a smartwatch, main components include a case, a crown, and an internal mechanism. One end of the crown is disposed outside the case, and the other end of the crown is disposed in the internal mechanism, to implement control on the smartwatch by controlling the crown. The crown is configured to adjust time in a conventional watch. However, in the smartwatch, the crown is configured to perform control in human-computer interaction. For example, a specific function may be implemented by pressing the crown, another specific function may be implemented by rotating the crown. Therefore, a corresponding sensor is disposed around a part of the crown in the internal mechanism to sense pressing and rotation of the crown, to further implement a corresponding control function. However, in an aspect, a part of the crown needs to be exposed outside the case to facilitate user operation. In another aspect, a part of the crown needs to be located in the internal mechanism in the case to facilitate sensing of an action of the crown via the sensor. Consequently, this arrangement of the crown hinders disassembly between the case and the internal mechanism and the crown needs to be disassembled before the case and the internal mechanism are disassembled. In this case, disassembly and assembly procedures between the internal mechanism and the case are complex, and are difficult to operate.

As shown in FIG. 1 to FIG. 9, embodiments of this application provide a smartwatch, including: a case 1, a crown 2, a guide rod 3 and an internal mechanism case 4. The case 1 is detachably connected to an outer side of the internal mechanism case 4. A through hole 10 is disposed on the case 1. The guide rod 3 is disposed on the internal mechanism case 4 and is opposite to the through hole 10. The crown 2 includes a knob 21 and a stem 22, where at least a part of the stem 22 passes through the through hole 10, and the knob 21 is located on a side that is of the through hole 10 and that is away from the guide rod 3. When the knob 21 is subject to pressure, the stem 22 is configured to move in an axial direction and approach the guide rod 3. When the knob 21 is subject to pulling force, the stem 22 is configured to move in an axial direction and leave the guide rod 3. When the knob 21 is subject to rotation force, the stem 22 is configured to rotate and drive the guide rod 3 to rotate.

Figure 5:
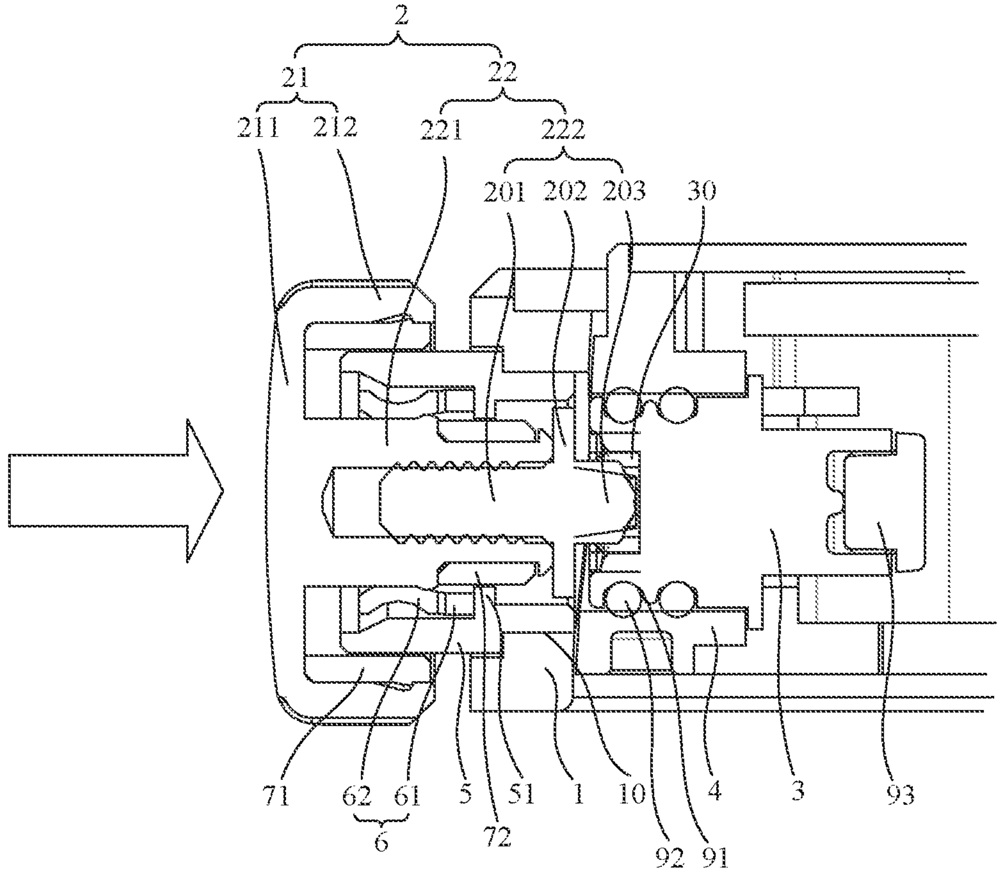
FIG. 5 is a schematic diagram of a cross-sectional structure of a crown in an AA' direction in a pressed state in FIG. 1.
Figure 6:
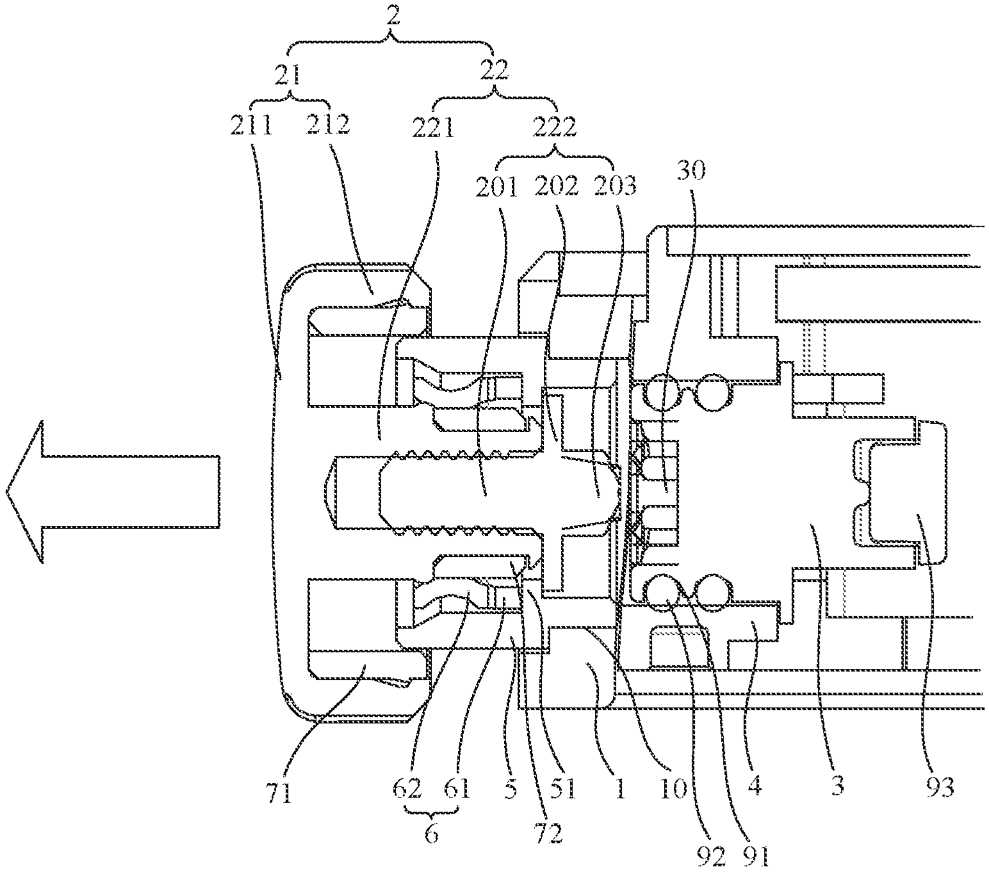
FIG. 6 is a schematic diagram of a cross-sectional structure of a crown in an AA' direction in a pulled state in FIG. 1.
Figure 7:
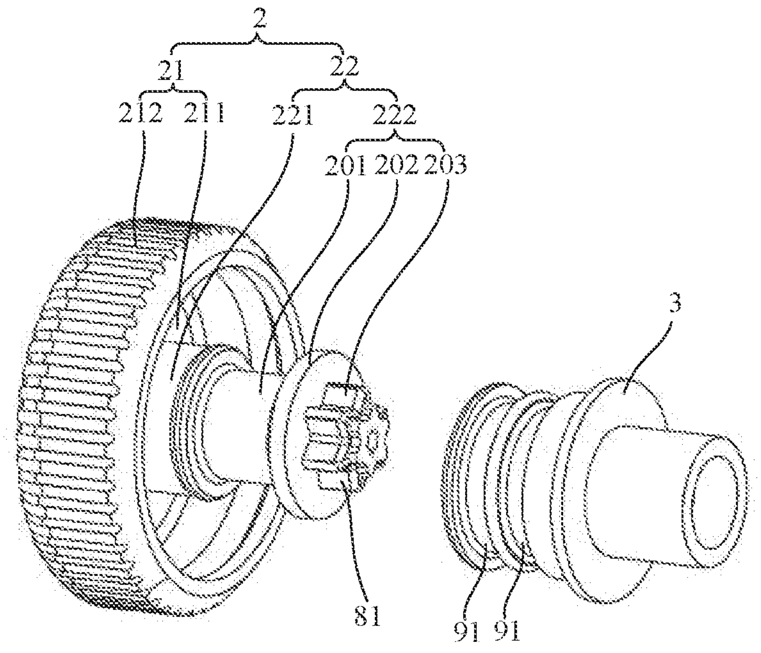
FIG. 7 is a schematic diagram of structures of a crown and a guide rod according to an embodiment of this application.
Figure 8:
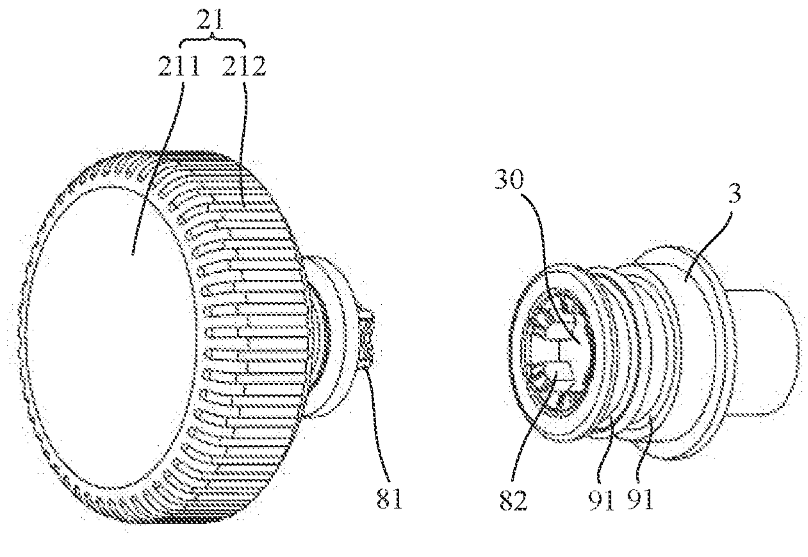
FIG. 8 is a schematic diagram of structures of the crown and the guide rod in FIG. 7 from another angle.
Figure 9:
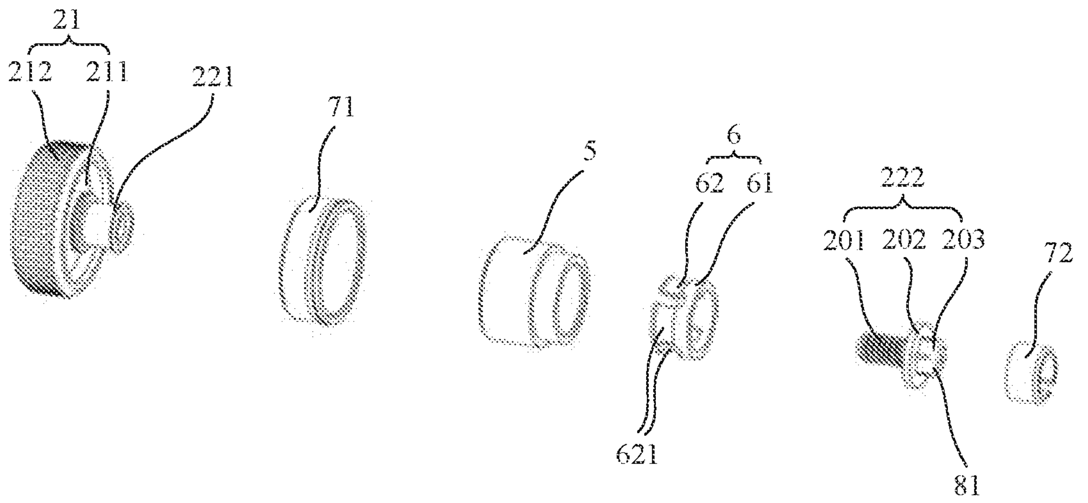
FIG. 9 is an exploded view of a crown according to an embodiment of this application.
Figure 10:
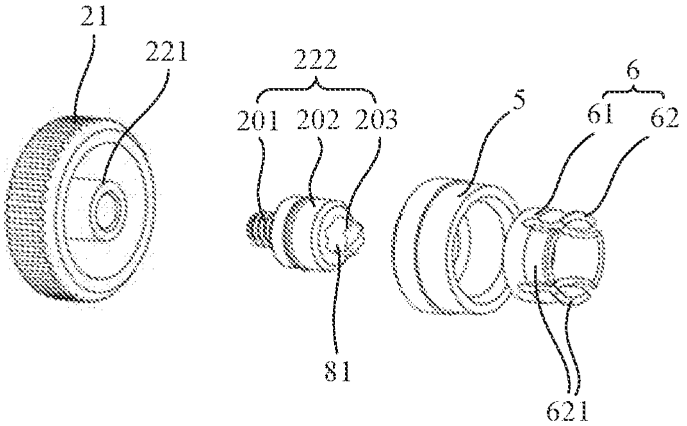
FIG. 10 is an exploded view of another crown according to an embodiment of this application.
Figure 11:
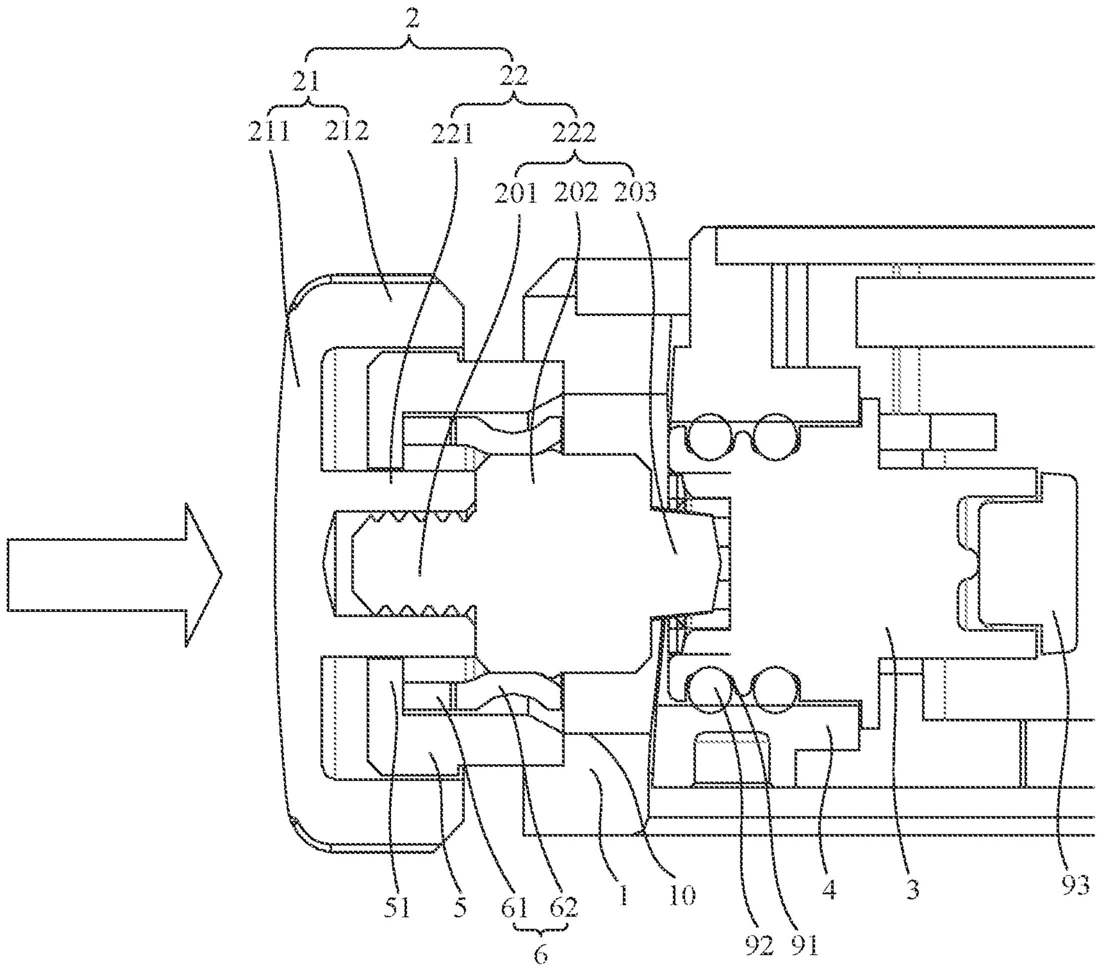
FIG. 11 is a schematic diagram of a cross-sectional structure of another crown in an AA' direction in a pressed state in FIG. 1.
Figure 12:
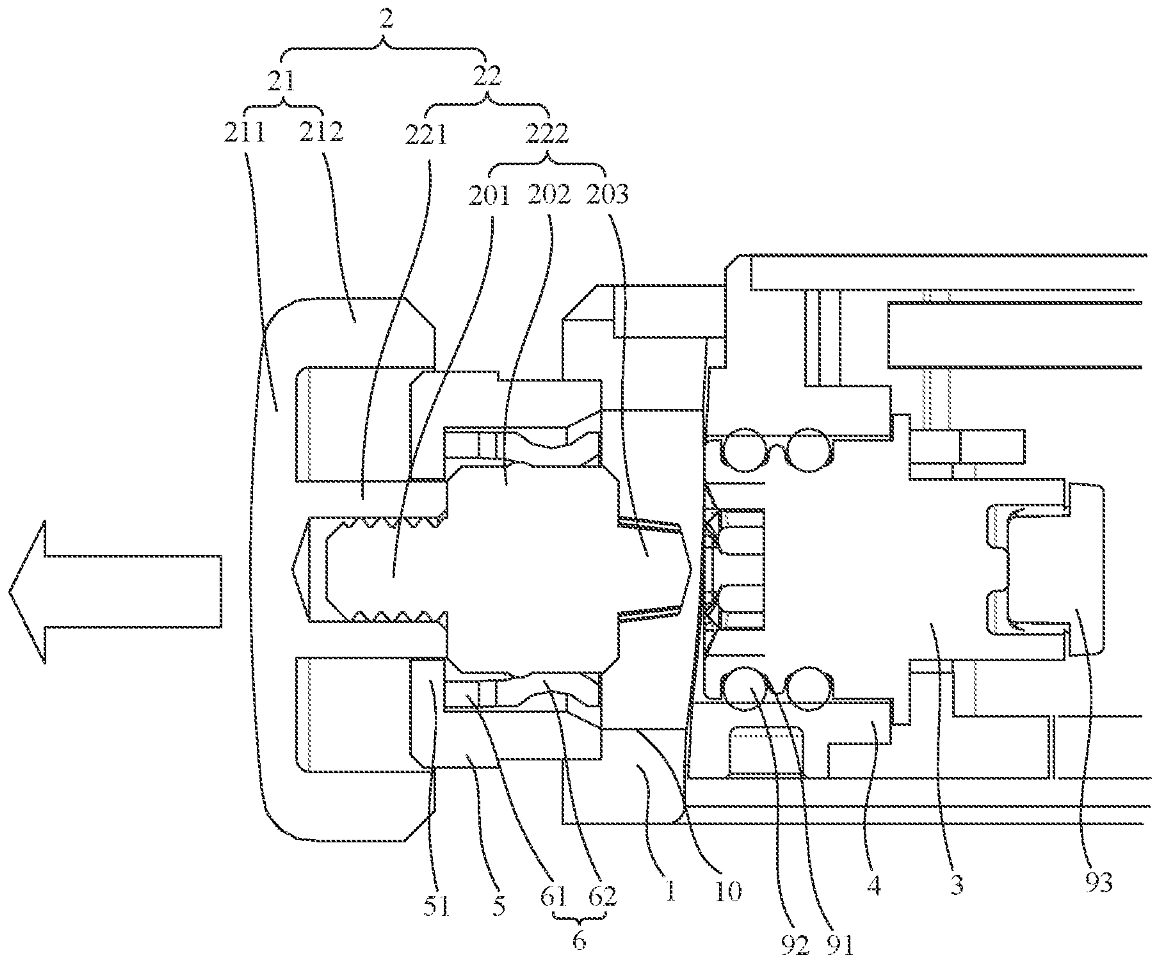
FIG. 12 is a schematic diagram of a cross-sectional structure of another crown in an AA' direction in a pulled state in FIG. 1.

Specifically, an internal mechanism is disposed in the internal mechanism case 4, and the internal mechanism is not shown in the figure. The internal mechanism is a device body of the smartwatch, and a mechanical structure, a sensor, a CPU, a battery, and the like may be disposed in the internal mechanism case 4. That the knob 21 is subject to the pressure means that the knob 21 is pressed toward the guide rod 3. In this case, the knob 21 and the stem 22 move in the axial direction of the stem 22 together and approach the guide rod 3. When touching the guide rod 3 and continuing to move, the stein 22 drives the guide rod 3 to move, so that an end that is of the guide rod 3 and that is away from the through hole 10 touches a pressing sensor (which is not shown in the figure, and may be an electronic switch element such as a press-type pressure sensor, a dome, or the like, where a switch can be turned on and conducted under specific pressure, the switch is turned off when the pressure is canceled, and a circuit can be turned on or off in the electronic switch element by changing force on a metal spring). Whether a user is pressing the crown 2 may be determined through detection of the pressing sensor, to perform a corresponding control operation. FIG. 5 is a schematic diagram of a cross-sectional structure of a crown in an AA' direction in a pressed state in FIG. 1, and a direction of an arrow represents a pressure direction. When the knob 21 is subject to the rotation force, the stem 22 rotates, and the stem 22 drives the guide rod 3 to rotate through fitting between the stem 22 and the guide rod 3. A rotation sensor (which is not shown in the figure, and may be a Hall sensor, an optical sensor, or the like, where the optical sensor can emit invisible light, to receive reflected invisible light, and sense an electrical signal) is disposed around the guide rod 3 in the internal mechanism. A rotation operation of the user on the crown 2 can be determined through rotation detection on the guide rod 3 by the rotation sensor. The process of pressing or rotating the crown 2 needs fitting between the crown 2 and the guide rod 3. When the knob 21 is subject to the pulling force, the stem 22 moves in the axial direction and leaves the guide rod 3, to be separated from fitting between the stem 22 and the guide rod 3. FIG. 6 is a schematic diagram of a cross-sectional structure of a crown in an AA direction in a pulled state in FIG. 1, and a direction of an arrow represents a pulled direction. It can be seen that the crown 2 and the guide rod 3 form a clutch mechanism. The crown 2 may be controlled to be fitted with the guide rod 3, or to be separated from the guide rod 3 can be separated, in other words, the crown 2 can be separated from the internal mechanism case 4. After the crown 2 leaves the guide rod 3 and is separated from the internal mechanism case 4, disassembly or assembly between the internal mechanism case 4 and the case 1 can be implemented.

In the smartwatch in embodiments of this application, the crown may approach or leave the guide rod in the internal mechanism case, and the rotation operation or pressing operation can be implemented through the fitting between the crown and the guide rod. When the crown leaves the guide rod and is separated from the internal mechanism case, the disassembly or assembly between the internal mechanism case and the case can be implemented. No complex crown disassembly process is needed, and the case can be conveniently disassembled from the internal mechanism and assembled on the internal mechanism. Therefore, a requirement of the user for replacing the case is satisfied.

In a possible implementation, as shown in FIG. 1 to FIG. 9, the smartwatch further includes a crown tube 5. The crown tube 5 is fastened to the case 1, an inner cavity of the crown tube 5 and the through hole 10 are coaxially disposed, and the stem 22 passes through the inner cavity of the crown tube 5. A limiting structure 51 is disposed on the crown tube 5, and the limiting structure 51 is configured to limit a position of the stem 22 when the stem 22 moves in the axial direction and leaves the guide rod 3, to prevent the stem 22 from being separated from the crown tube 5. The crown tube 5 is configured to support and limit the stem 22. A manner of fastening the crown tube 5 to the case 1 is not limited in embodiments of this application. For example, the crown tube 5 may be threadedly connected to the case 1, and a threaded joint between the crown tube 5 and the case 1 can be further spot welded to prevent loosening.

In a possible implementation, as shown in FIG. 1 to FIG. 9, the smartwatch further includes a spring structure 6. The spring structure 6 is located between the crown tube 5 and the stem 22, and the spring structure 6 is configured to provide buffering in the process of pressing and pulling the crown 2 to improve a hand feeling of the user when operating the crown 2. The spring structure 6 may be fastened via the crown tube 5, and a joint between the spring structure 6 and the crown tube 5 can be further spot welded to prevent loosening.

In a possible implementation, as shown in FIG. 1 to FIG. 9, the spring structure 6 is an annular spring. The annular spring includes an annular support part 61 and an opening part 62. The opening part 62 includes a plurality of annularly arranged elastic parts 621. Any two adjacent elastic parts 621 are spaced from each other. A middle part of each elastic part 621 is bent in a direction close to the stem 22. The annular support part 61 may fit with the crown tube 5 to support and limit the stem 22. The opening part 62 is configured to provide stress buffering between the stem 22 and the crown tube 5 via a bent structure.

In a possible implementation, as shown in FIG. 1 to FIG. 9, the opening part 62 of the annular spring is located on a side that is of the annular support pail 61 and that is away from the guide rod 3. Because the opening part 62 having the bent structure is close to the knob 21, an effect of providing a pressing hand feeling is better.

In a possible implementation, as shown in FIG. 1 to FIG. 9, the knob 21 includes a top plate 211 and a side plate 212. An end that is of the stem 22 and that is away from the guide rod 3 is connected to the top plate 211. The side plate 212 extends along an edge of the top plate 211 and is disposed around the stem 22. The side plate 212, the top plate 211, and the stem 22 form a groove that is of the knob and that faces the guide rod 3, and at least a part of the crown tube 5 is located in the groove of the knob. The spring structure 6 is located on a side that is of the limiting structure 51 and that is away from the guide rod 3. The top plate 211 of the knob 21 is convenient for the user to press, and the side plate 212 is convenient for the user to pull and rotate. At least a part of the crown tube 5 is surrounded by the side plate 212, to provide space for relative displacement and rotation between the crown tube 5 and the knob 21. This implements a compact and reliable clutch mechanism.

In a possible implementation, as shown in FIG. 1 to FIG. 9, the smartwatch further includes a first friction gasket 71 located between the crown tube 5 and the side plate 212, and a second friction gasket 72 located between the limiting structure 51 and the stem 22. During rotation or movement of the knob 21, an inner surface of the side plate 212 and the crown tube 5 are fitted via the first friction gasket 71. This reduces damage on the side plate 212 and the crown tube 5 caused by friction. Similarly, the limiting structure 51 and the stem 22 are fitted via the second friction gasket 72. This reduces damage on the limiting structure 51 and the stem 22 caused by friction. The first friction gasket 71 and the second friction gasket 72 may be made of friction-resistant materials. To further ensure reliability, the first friction gasket 71 may be fastened to any one of the side plate 212 and the crown tube 5, and the second friction gasket 72 may be fastened to any one of the limiting structure 51 and the stem 22. In addition, in addition to a manner of separately manufacturing a friction gasket and then assembling the friction gasket, the friction gasket and other structures may alternatively be manufactured together. For example, the first friction gasket 71 is formed on the knob 21 in a manner of injection molding, and the second friction gasket 72 is formed on the stem 22 in the manner of injection molding.

In a possible implementation, as shown in FIG. 1 to FIG. 9, the stem 22 includes a knob fitting part 221 and a guide rod fitting part 222, and the knob fitting part 221 is fastened to the top plate 211. The knob fitting part 221 is a cylindrical structure facing the guide rod 3, and an inner wall of the cylindrical structure has an internal thread. The guide rod fitting part 222 includes an external thread part 201, a limiting and blocking part 202, and a transmission part 203. The external thread part 201 is located on a side that is of the limiting and blocking part 202 and that is away from the transmission part 203. The external thread part 201 is located in the cylindrical structure and is threadedly connected to the cylindrical structure. The limiting and blocking part 202 is located between the limiting structure 51 and the guide rod 3. The knob fitting part 221 and the knob 21 may be an integrated structure. In the process of pulling the crown 2, the limiting structure 51 may limit the stem 22 by blocking the limiting and blocking part 202, to prevent the crown 2 from being pulled out of the crown tube 5. However, it is enough to enable the stem 22 to be separated from fitting between the stem 22 and the guide rod 3, and enable the stem 22 to be separated from the internal mechanism case 4, to facilitate disassembly or assembly between the case 1 and the internal mechanism case 4. Because the guide rod fitting part 222 and the knob fitting part 221 are separate parts, the knob fitting part 221 may be assembled after the guide rod fitting part 222 is assembled and limited. In addition, to further improve reliability, after the knob fitting part 221 is threadedly connected to the guide rod fitting part 222, and a threaded joint between the knob fitting part 221 and the guide rod fitting part 222 may be spot welded to prevent loosening. In another possible implementation, the threaded connection between the knob fitting part 221 and the guide rod fitting part 222 may be changed to another fastening connection manner, for example, direct pressing in combination with spot welding fastening.

In a possible implementation, as shown in FIG. 1 to FIG. 4 and FIG. 10 to FIG. 12, the opening part 62 of the annular spring is located on a side that is of the annular support part 61 and that is close to the guide rod 3.

In a possible implementation, as shown in FIG. 1 to FIG. 4 and FIG. 10 to FIG. 12, the knob 21 includes a top plate 211 and a side plate 212, and an end that is of the stem 22 and that is away from the guide rod 3 is connected to the top plate 211. The side plate 212 extends along an edge of the top plate 211 and is disposed around the stem 22. The side plate 212, the top plate 211, and the stem 22 form a groove that is of the knob and that faces the guide rod 3. The limiting structure 51 is located in the groove of the knob groove. The spring structure 6 is located on a side that is of the limiting structure 51 and that is close to the guide rod 3. The limiting structure 51 may be located at an end part of a side that is of the crown tube 5 and that is away from the guide rod 3. A compact structure is formed among the crown 2, the crown tube 5, and the spring structure 6, and a space utilization rate is high.

In a possible implementation, as shown in FIG. 1 to FIG. 4 and FIG. 10 to FIG. 12, the stein 22 includes a knob fitting part 221 and a guide rod fitting part 222, and the knob fitting part 221 is fastened to the top plate 211. The knob fitting part 221 is a cylindrical structure facing the guide rod 3, and an inner wall of the cylindrical structure has an internal thread. The guide rod fitting part 222 includes an external thread part 201, a limiting and blocking part 202, and a transmission part 203. The external thread part 201 is located on a side that is of the limiting and blocking part 202 and that is away from the transmission part 203. The external thread part 201 is located in the cylindrical structure and is threadedly connected to the cylindrical structure. The limiting and blocking part 202 is located between a cylinder wall of the cylindrical structure and the guide rod 3. The knob fitting part 221 and the knob 21 may be an integrated structure. In the process of pulling the crown 2, the limiting structure 51 may limit the stem 22 by blocking the limiting and blocking part 202, to prevent the crown 2 from being pulled out of the crown tube 5. However, it is enough to enable the stem 22 to be separated from fitting between the stem 22 and the guide rod 3, and enable the stem 22 to be separated from the internal mechanism case 4, to facilitate disassembly or assembly between the case 1 and the internal mechanism case 4. Because the guide rod fitting part 222 and the knob fitting part 221 are separate parts, the knob fitting part 221 may be assembled after the guide rod fitting part 222 is assembled and limited. In addition, to further improve reliability, after the knob fitting part 221 is threadedly connected to the guide rod fitting part 222, and a threaded joint between the knob fitting part 221 and the guide rod fitting part 222 may be spot welded to prevent loosening. In another possible implementation, the threaded connection between the knob fitting part 221 and the guide rod fitting part 222 may be changed to another fastening connection manner, for example, direct pressing in combination with spot welding fastening.

In a possible implementation, as shown in FIG. 5 to FIG. 14, a driving gear 81 is disposed at an end that is of the stem 22 and that is away from the knob 21. A driven gear 82 is disposed at an end that is of the guide rod 3 and that is close to the through hole 10. When the stem 22 moves in the axial direction, and approaches and touches the guide rod 3, the driving gear 81 meshes with the driven gear 82. When the driving gear 81 meshes with the driven gear 82, and the knob 21 is subject to the rotation force, the stem 22 is configured to rotate, and drive the guide rod 3 to rotate via the driving gear 81 and the driven gear 82. With reference to the foregoing specific embodiment, the driving gear 81 may be the transmission part 203. In other words, rotational transmission is implemented through transmission fitting between the driving gear 81 and the guide rod 3. The gear meshing between the stem 22 and the guide rod 3 can further fasten an internal mechanism assembled to the case 1, so that the internal mechanism is not easily separated from the case 1 under an action of external force, and prevent the internal mechanism from being separated from the case 1 for example, when the smartwatch falls.

In a possible implementation, as shown in FIG. 5 to FIG. 14, a guide rod groove 30 is disposed at the end that is of the guide rod 3 and that is close to the through hole 10, and the driven gear 82 is disposed in the guide rod groove 30. When the knob 21 is pressed, the stem 22 is driven to move and extend into the guide rod groove 30, so that the driving gear 81 meshes with the driven gear 82. If the knob 21 is pressed continuously, the stem 22 drives the guide rod 3 to move, so that the end that is of the guide rod 3 and that is away from the through hole 10 touches a pressing sensor (which is not shown in the figure). Whether the user is pressing the crown 2 can be determined by detecting the pressing sensor, to perform a corresponding control operation. When the knob 21 is subject to the pulling force, the stem 22 moves in the axial direction and leaves the guide rod groove 30, to be separated from the fitting between the stein 22 and the guide rod 3. Therefore, disassembly or assembly between the internal mechanism case 4 and the case 1 can be implemented. When the stem 22 extends into the guide rod groove 30, the stem 22 can be limited via the guide rod groove 30 to improve stability of the crown 2 during control, and the case 1 and the internal mechanism case 4 can be locked. Disassembly between the internal mechanism case 4 and the case 1 cannot be performed directly.

Figure 13:
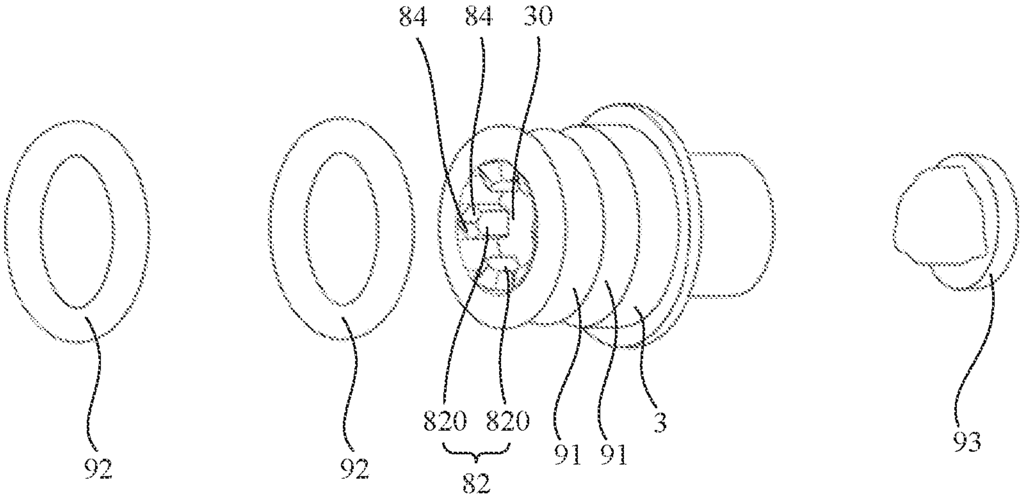
FIG. 13 is an exploded view of a guide rod and a peripheral structure according to an embodiment of this application.
Figure 14:
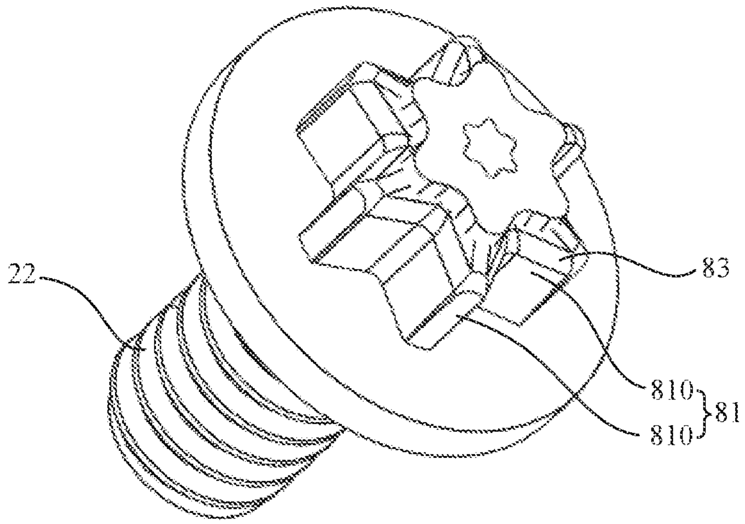
FIG. 14 is a schematic diagram of a structure of a stem according to an embodiment of this application.
Figure 15:
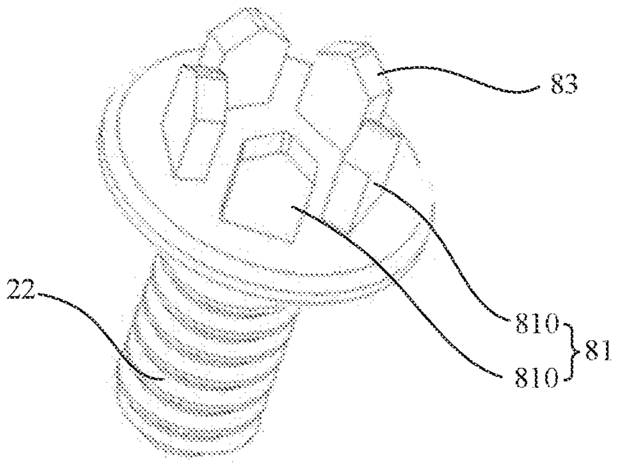
FIG. 15 is a schematic diagram of a structure of another stem according to an embodiment of this application.
Figure 16:
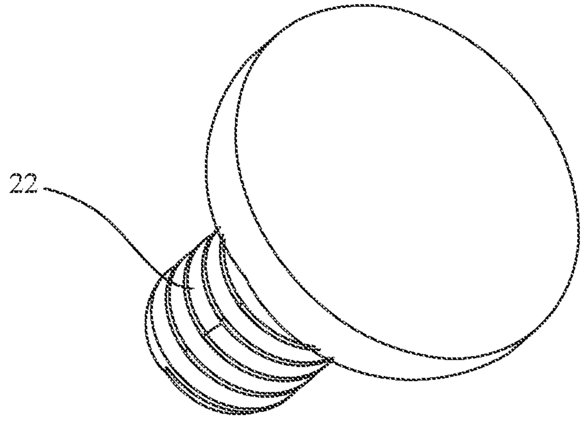
FIG. 16 is a schematic diagram of a structure of still another stem according to an embodiment of this application.
Figure 17:
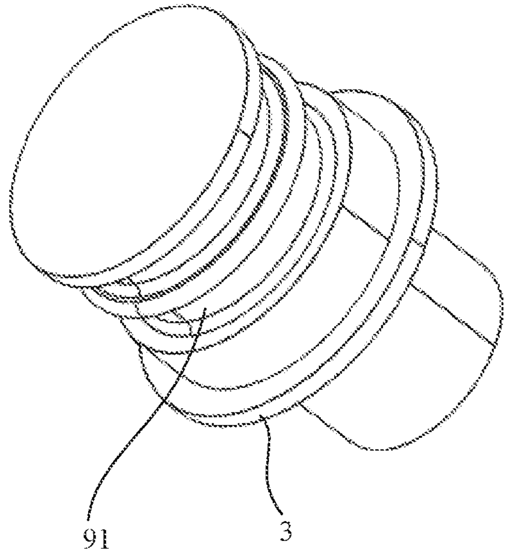
FIG. 17 is a schematic diagram of a structure of another guide rod according to an embodiment of this application.
Figure 18:
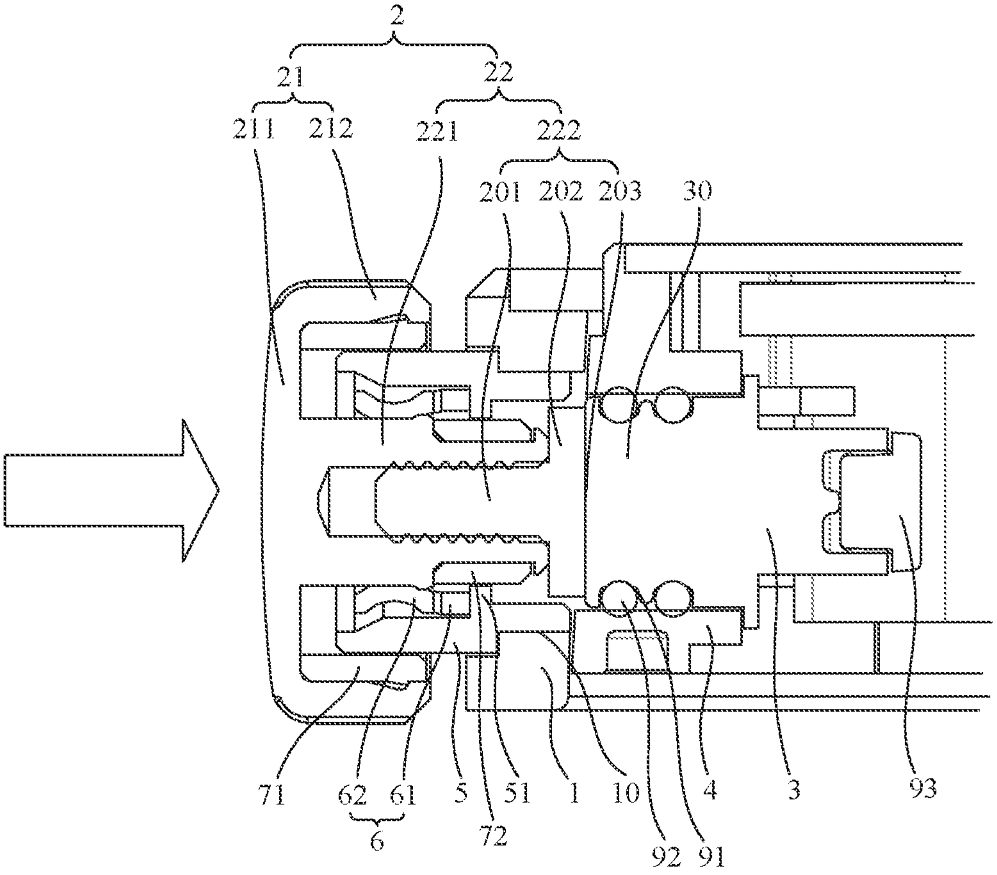
FIG. 18 is a schematic diagram of a cross-sectional structure of still another crown in an AA' direction in a pressed state in FIG. 1.
Figure 19:
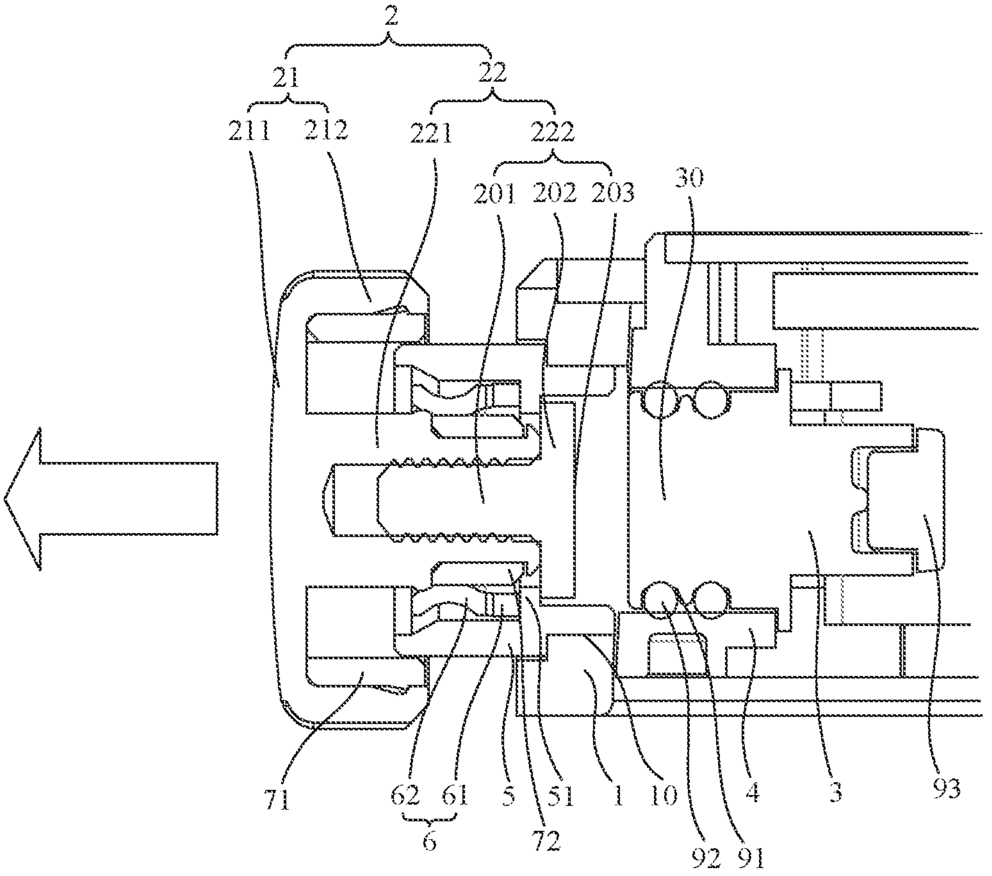
FIG. 19 is a schematic diagram of a cross-sectional structure of still another crown in an AA' direction in a pulled state in FIG. 1.

In a possible implementation, as shown in FIG. 14, a first guide surface 83 is disposed at an end part of the driving gear 81. For example, the driving gear 81 includes a plurality of driving teeth 810, and an end that is of each driving tooth 810 and that is away from the stem 22 includes at least one first guide surface 83 inclined towards an edge of the driving tooth 810. As shown in FIG. 13, a second guide surface 84 is disposed at an end part of the driven gear 82. For example, the driven gear 82 includes a plurality of driven teeth 820, and an end that is of each driven tooth 820 and that is close to the through hole 10 includes at least one second guide surface 84 inclined towards an edge of the driven teeth 820. The first guide surface 83 and the second guide surface 84 provide a guiding function in a process in which the stem 22 gradually extends into the guide rod groove 30, so that the driving gear 81 and the driven gear 82 slide into, based on the guiding function of the guiding surface, a position in which the driving gear 81 meshes with the driven gear 82. Therefore, the guide rod 3 can be driven to rotate via a gear in a subsequent rotation process of the knob 21. In addition, in structures shown in FIG. 13 and FIG. 14, the driving tooth 810 is disposed in a middle part of an end surface of the stem 22, the driven tooth 820 is disposed in a side wall of the guide rod groove 30. The driving tooth 810 has an inclined side surface tapering from the middle to the outside. Similarly, the driven tooth 820 has an inclined side surface tapering from the side wall of the guide rod groove 30 to a middle part of the guide rod groove 30. Stability of meshing between gears can be improved through fitting between the inclined side surfaces. In the structures shown in FIG. 13 and FIG. 14, the driving gear 81 has six driving teeth 810, and the driven gear 82 has corresponding six driven teeth 820. However, a quantity of the driving teeth 810 and a quantity of the driven teeth 820 are not limited in this embodiment of this application, provided that a meshing and fitting relationship can be formed between the driving gear 81 and the driven gear 82. In another possible implementation, the driving teeth 810 and the driven teeth 820 may alternatively in other shapes. For example, as shown in FIG. 15, the driving gear 81 has five driving teeth 810, and the five driving teeth 810 are disposed independently and spaced from each other, and are arranged annularly. There is a driving tooth inclined surface 83 that is inclined from the middle to the outside on a top part of each driving tooth 810. It may be understood that a structure of the driving gear 81 shown in FIG. 15 needs a structure of a driven gear that can adaptively mesh with the driving gear 81.

Figure 20:
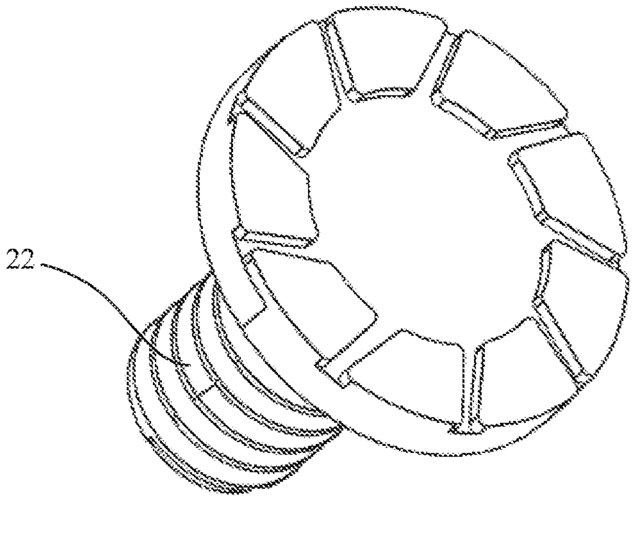
FIG. 20 is a schematic diagram of a structure of yet another stem according to an embodiment of this application.

In a possible implementation, rotational transmission between an end that is of the stem 22 and that is away from the guide rod 3 and the knob 21 may be implemented in a damping manner. For example, as shown in FIG. 16 to FIG. 19, an end surface that is of the stem 22 and that is away from the knob 21 and an end surface that is of the guide rod 3 and that is close to the through hole 10 are friction end surfaces. For example, a friction end surface is a plane structure, an interference fitting manner is used, and the two end surfaces are made of materials with strong friction force. A function of driving the guide rod 3 to rotate when the crown 2 is rotated is implemented by using friction force, conduction force, and a torque between the planes. A material, size, and matching area of a friction fitting position are not limited herein, provided that the friction force can reach a standard. With reference to the foregoing embodiment, it may be understood that the transmission part 203 is a friction end surface. In addition, to improve a friction coefficient and improve an effect of friction transmission, as shown in FIG. 20, a first friction thread is disposed on the end surface that is of the stem 22 and that is away from the knob 21, and/or a second friction thread (which is not shown in the figure) is disposed on the end surface that is of the guide rod 3 and that is close to the through hole 10. In other words, reliability of the friction transmission can be further improved via an end surface having a friction thread. Specifically, a process of controlling the knob 21 to drive the guide rod to implement pressing and rotating functions is similar to that in the foregoing embodiment. When being pressed, the knob 21 drives the stem 22 to move and push the guide rod 3, and the stem 22 drives the guide rod 3 to move. In this way, the end that is of the guide rod 3 and that is away from the through hole 10 touches the pressing sensor (which is not shown in the figure). Whether the user is pressing the crown 2 can be determined by detecting the pressing sensor, to perform a corresponding control operation. When the knob 21 is subject to the pulling force, the stem 22 moves in the axial direction and leaves the guide rod 3, to be separated from the fitting between the stem 22 and the guide rod 3. Therefore, disassembly or assembly between the internal mechanism case 4 and the case 1 can be implemented. When the knob 21 is subject to the rotation force, the stem 22 rotates, and the stem 22 drives the guide rod 3 to rotate through friction fitting between the stem 22 and the guide rod 3. A rotation sensor (which is not shown in the figure) is disposed around the guide rod 3 in the internal mechanism A rotation operation of the user on the crown 2 can be determined through rotation detection on the guide rod 3 by the rotation sensor. It may be understood that no gear structure may be disposed on the stem 22 and the guide rod 3 in FIG. 11 and FIG. 12, and rotation torque is transmitted in a friction manner.

Figure 21:
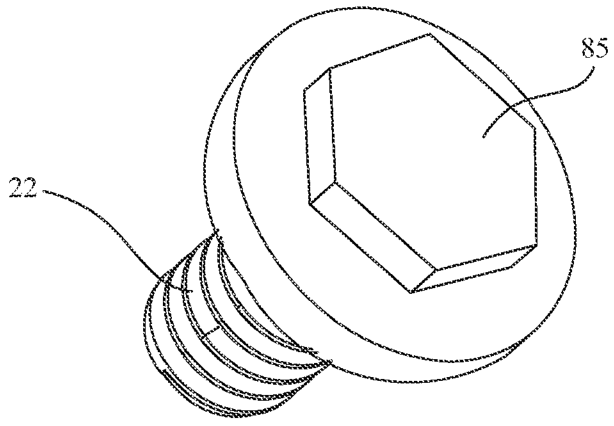
FIG. 21 is a schematic diagram of a structure of still yet another stem according to an embodiment of this application.
Figure 22:
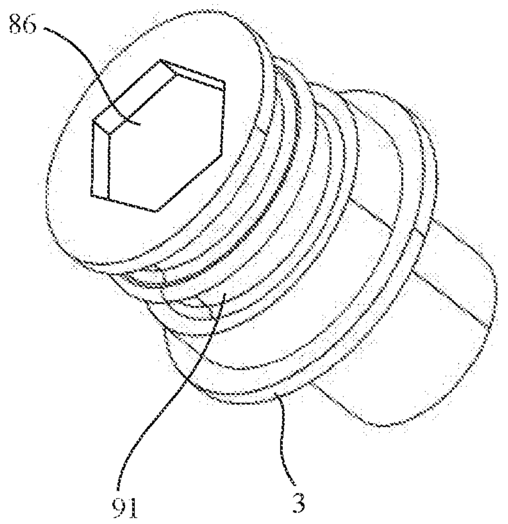
FIG. 22 is a schematic diagram of a structure of still another guide rod according to an embodiment of this application.

In a possible implementation, as shown in FIG. 21 and FIG. 22, a rotation limiting part 85 is disposed at an end that is of the stein 22 and that is away from the knob 21, and a rotation limiting groove 86 is disposed at an end that is of the guide rod 3 and that is close to the through hole 10. Alternatively, a rotation limiting groove is disposed at an end that is of the stem 22 and that is away from the knob 21, and a rotation limiting part is disposed at an end that is of the guide rod 3 and that is close to the through hole 10. When the stein 22 moves in the axial direction, and approaches and touches the guide rod 3, the rotation limiting part 85 is engaged with the rotation limiting groove 86. When the rotation limiting part 85 is engaged with the rotation limiting groove 86, and the knob 21 is subject to the rotation force, the stem 22 is configured to rotate, and drive the guide rod 3 to rotate through engagement between the rotation limiting part 85 and the rotation limiting groove 86. With reference to the foregoing embodiment, the rotation limiting part or the rotation limiting groove disposed at the end that is of the stem 22 and that is away from the knob 21 may be the transmission part 203. For example, the rotation limiting part 85 is a hexagonal prism structure, and the rotation limiting groove 86 is a corresponding hexagonal prism groove. When the stem 22 moves in the axial direction and approaches the guide rod 3, the rotation limiting part 85 can extend into the rotation limiting groove 86 to implement the engagement between the rotation limiting part 85 and the rotation limiting groove 86. When the stem 22 moves in the axial direction and leaves the guide rod 3, the stem 22 and the guide rod 3 can be separated, to facilitate the disassembly or assembly between that internal mechanism case 4 and the case 1. When the rotation limiting part 85 and the rotation limiting groove 86 are engaged with each other, the rotation torque can be transmitted. In another possible implementation, the rotation limiting part 85 and the rotation limiting groove 86 may be of other structures, provided that the rotation limiting part 85 and the rotation limiting groove 86 have a rotation limiting function when the rotation limiting part 85 and the rotation limiting groove 86 are engaged with each other, to implement a function of transmitting the rotation torque. The engagement between the stein 22 and the guide rod 3 can further fasten an internal mechanism assembled to the case 1, so that the internal mechanism is not easily separated from the case 1 under an action of external force, and prevent the internal mechanism from being separated from the case 1, for example, when the smartwatch falls.

In a possible implementation, as shown in FIG. 5, FIG. 6, FIG. 7, FIG. 8, FIG. 11, FIG. 12, FIG. 13, FIG. 17, FIG. 18, and FIG. 19, a waterproof groove 91 is disposed around the guide rod 3, and a sealing ring 92 is disposed in the waterproof groove 91. The sealing ring 92 is used for waterproofing of the internal mechanism.

In addition, as shown in FIG. 5, FIG. 6, FIG. 1L FIG. 12, FIG. 13, FIG. 18, and FIG. 19, a buffer gasket 93 may be disposed on a side that is of the guide rod 3 and that is away from the through hole 10. The buffer gasket 93 may be made of a soft glue material, to reduce, in the process of pressing the crown 2, an impact on the pressing sensor when the guide rod 3 touches the pressing sensor, and reduce a probability of damage on the pressing sensor.

Figure 23:
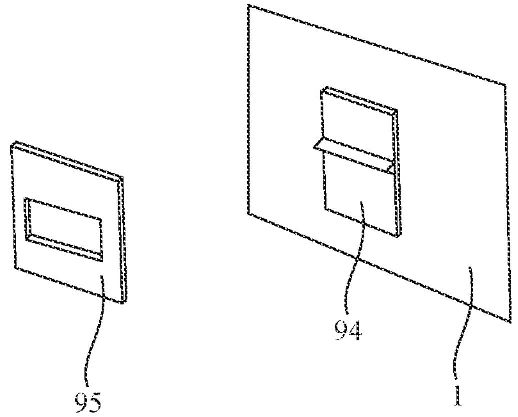
FIG. 23 is a schematic diagram of an exploded structure of a buckle and an outer frame on an inner surface of a case according to an embodiment of this application.

In addition, the following describes a detachable assembly manner between the case 1 and the internal mechanism case 4. As shown in FIG. 23 (where only a part of an inner wall of the case 1 is shown), the case 1 and the internal mechanism case 4 are detachably connected via a buckle. For example, a plurality of buckle gaskets 94 (only one shown in the figure) are disposed on an inner side of the case 1, and the buckle gaskets 94 may be made of soft glue. A buckle gasket 94 is fastened on the case 1 via an outer frame 95. The outer frame 95 may be made of metal materials, and the outer frame 95 may be fastened on the case 1 through spot welding. A card groove is disposed at a corresponding position on an outer surface of the internal mechanism case 4. The detachable connection between the case 1 and the internal mechanism case can be implemented through fitting between the card groove and the buckle, and the case 1 and the internal mechanism case can be disassembled and assembled via the buckle in a direct pressing manner. This is simple and convenient, and has less restriction on appearance, and the outer side of the case 1 may be pure round transition.

In embodiments of this application, "at least one" means one or more, and "a plurality of" means two or more. The term "and/or" describes an association relationship between associated objects, and represents that three relationships may exist. For example, A and/or B may represent the following three cases: Only A exists, both A and B exist, and only B exists. A and B may be singular or plural. The character "/" generally represents an "or" relationship between the associated objects. "At least one of the following items" and similar expressions mean any combination of these terms, including any combination of singular or plural terms. For example, at least one of a, b, and c may represent: a, b, c, a and b, a and c, b and c, or a, b, and c, where a, b, and c may be singular or plural.

The foregoing descriptions are merely examples, and are not limited to this application. For a person skilled in the art, various modifications and variations may be made in this application. Any modification, equivalent replacement, or improvement made without departing from the spirit and principle of this application shall fall within the protection scope of this application.

What is claimed is:

1. A smartwatch comprising:
an internal mechanism case comprising an outer side;
a guide rod disposed on the internal mechanism case;
a case detachably coupled to the outer side, wherein the case comprises a through hole opposite the guide rod;
a crown tube fastened to the case and comprising an inner cavity coaxially disposed in the through hole;
a limiting structure disposed on the crown tube and configured to limit a position of a stem when the stem moves in an axial direction away from the guide rod to prevent the stem from being separated from the crown tube; and
a crown comprising:
the stem, wherein at least a part of the stem extends through the through hole and through the inner cavity, and wherein the stem comprises a first end adjacent to the guide rod and comprises a second end;
a knob located on the second end;
a spring structure located between the crown tube and the stem, wherein the spring structure comprises an annular spring comprising:
an annular support part; and
an opening part disposed on the annular support part and comprising a plurality of annularly arranged elastic parts, wherein any two adjacent elastic parts are spaced from each other, and wherein a middle part of each of the annularly arranged elastic parts is bent in a direction toward the stem,
wherein the stem is configured to:
move in the axial direction and approach the guide rod when the knob is subject to pressure;
move in the axial direction and away from the guide rod when the knob is subject to a pulling force; and
rotate and drive the guide rod to rotate when the knob is subject to a rotation force.

2. The smartwatch of claim 1, wherein the knob comprises:

a top plate coupled to the second end and comprising an edge; and a side plate extending along the edge and disposed around the stem, wherein the knob further comprises a groove that is defined by the side plate, the top plate, and the stem and that faces the guide rod.

3. The smartwatch of claim 1, wherein the stem comprises:

a knob fitting part fastened to the knob, having a cylindrical structure facing the guide rod, and wherein an inner wall of the cylindrical structure comprises an internal thread; and a guide rod fitting part comprising:

a transmission part;

a limiting and blocking part located between the limiting structure and the guide rod and comprising a second side located distal from the transmission part; and an external thread part located on the second side, is further located in the cylindrical structure, and threadedly coupled to the cylindrical structure.

4. The smartwatch of claim 1, wherein the annular support part comprises a second side located proximate to the guide rod, and wherein the opening part is located on the second side.

5. The smartwatch of claim 1, wherein the knob comprises a groove, wherein the limiting structure is located in the groove, wherein the limiting structure comprises a second side located proximate to the guide rod, and wherein the spring structure is located on the second side.

6. The smartwatch of claim 1, further comprising:

a rotation limiting part; and a rotation limiting groove, wherein:

(a) the rotation limiting part is disposed at the first end of the stem and the rotation limiting groove is disposed at an end that is of the guide rod that is proximate to the through hole; or (b) the rotation limiting groove is disposed at the first end of the stem, and the rotation limiting part is disposed at an end that is of the guide rod and that is proximate to the through hole, wherein the rotation limiting part is configured to engage with the rotation limiting groove when the stem moves in the axial direction and approaches and touches the guide rod, and wherein the stem is configured to rotate and drive the guide rod to rotate through engagement between the rotation limiting part and the rotation limiting groove when the rotation limiting part is engaged with the rotation limiting groove and when the knob is subject to the rotation force.

7. The smartwatch of claim 1, further comprising:

a driving gear disposed at the first end of the stem; and a driven gear disposed at an end of the guide rod that is proximate to the through hole, wherein the driving gear is configured to mesh with the driven gear when the stem moves in the axial direction and approaches and touches the guide rod, and wherein the stem is configured to rotate and drive the guide rod to rotate via the driving gear and the driven gear when the driving gear meshes with the driven gear and when the knob is subject to the rotation force.

8. The smartwatch of claim 7, further comprising a guide rod groove disposed at the end that is proximate to the through hole, wherein the driven gear is disposed in the guide rod groove.

9. The smartwatch of claim 7, further comprising:

a first guide surface disposed at a first end part of the driving gear; and a second guide surface disposed at a second end part of the driven gear.

10. The smartwatch of claim 1, wherein the stem comprises a first end surface located at the first end, wherein the guide rod comprises an end surface located proximate to the through hole, and wherein the smartwatch further comprises:

a first friction thread disposed on the first end surface of the stem; or a second friction thread disposed on the end surface of the guide rod that is proximate to the through hole.

11. The smartwatch of claim 1, further comprising:

a waterproof groove disposed around the guide rod; and a sealing ring disposed in the waterproof groove.

12. The smartwatch of claim 1, wherein the stem comprises:

a knob fitting part fastened to the knob, the knob fitting part having a cylindrical structure facing the guide rod, wherein an inner wall of the cylindrical structure comprises an internal thread; and a guide rod fitting part comprising:

a transmission part;

a limiting and blocking part located between the limiting structure and the guide rod and comprising a second side located distal from the transmission part; and an external thread part located on the second side, further located in the cylindrical structure, and threadedly coupled to the cylindrical structure.

13. The smartwatch of claim 1, wherein the knob comprises:

a top plate coupled to the second end and comprising an edge; and a side plate extending along the edge and disposed around the stem, wherein the knob further comprises a groove that is defined by the side plate, the top plate, and the stem and that faces the guide rod, and wherein at least a part of the crown tube is located in the groove.

14. The smartwatch of claim 1, further comprising:

a rotation limiting part;

a rotation limiting groove;

a driving gear disposed at the first end of the stem; and a driven gear disposed at an end of the guide rod that is proximate to the through hole, wherein:

(a) the rotation limiting part is disposed at the first end of the stem and the rotation limiting groove is disposed at an end that is of the guide rod that is proximate to the through hole; or (b) the rotation limiting groove is disposed at the first end of the stem, and the rotation limiting part is disposed at an end that is of the guide rod and that is proximate to the through hole, wherein the rotation limiting part is configured to engage with the rotation limiting groove when the stem moves in the axial direction and approaches and touches the guide rod, wherein the driving gear is configured to mesh with the driven gear when the stem moves in the axial direction and approaches and touches the guide rod, and wherein the stem is configured to rotate and drive the guide rod to rotate through engagement between the rotation limiting part and the rotation limiting groove and via meshing of the driving gear and the driven gear when the knob is subject to the rotation force.

15. The smartwatch of claim 1, wherein the stem comprises:

a knob fitting part fastened to the knob and having a cylindrical structure facing the guide rod; and a guide rod fitting part comprising:

a transmission part; and a limiting and blocking part located between the limiting structure and the guide rod and comprising a second side located distal from the transmission part.

16. The smartwatch of claim 7, further comprising:

a guide rod groove disposed at the end that is proximate to the through hole, wherein the driven gear is disposed in the guide rod groove;

a first guide surface disposed at a first end part of the driving gear; and a second guide surface disposed at a second end part of the driven gear.

17. The smartwatch of claim 1, further comprising a buffer gasket disposed on a side of the guide rod that is distal from the through hole.

18. A smartwatch comprising:

an internal mechanism case comprising an outer side;

a guide rod disposed on the internal mechanism case;

a case detachably coupled to the outer side, wherein the case comprises a through hole opposite the guide rod;

a crown tube fastened to the case and comprising an inner cavity coaxially disposed in the through hole;

a limiting structure disposed on the crown tube and configured to limit a position of a stem when the stem moves in an axial direction away from the guide rod to prevent the stem from being separated from the crown tube; and a crown comprising:

the stem, wherein at least a part of the stem extends through the through hole and through the inner cavity, and wherein the stem comprises a first end adjacent to the guide rod and comprises a second end;

a knob located on the second end; and a spring structure located between the crown tube and the stem, wherein the spring structure comprises an annular spring comprising:

an annular support part; and an opening part disposed on the annular support part and comprising a plurality of annularly arranged elastic parts, wherein any two adjacent elastic parts are spaced from each other, and wherein a middle part of each of the annularly arranged elastic parts is bent in a direction toward the stem, wherein the stem is configured to:

move in the axial direction and approach the guide rod when the knob is subject to pressure;

move in the axial direction and away from the guide rod when the knob is subject to a pulling force; and rotate and drive the guide rod to rotate when the knob is subject to a rotation force, wherein the annular support part comprises a first side located distal from the guide rod, and wherein the opening part is located on the first side.

19. A smartwatch comprising:

an internal mechanism case comprising an outer side;

a guide rod disposed on the internal mechanism case;

a case detachably coupled to the outer side, wherein the case comprises a through hole opposite the guide rod;

a crown tube fastened to the case and comprising an inner cavity coaxially disposed in the through hole;

a limiting structure disposed on the crown tube and configured to limit a position of a stem when the stem moves in an axial direction away from the guide rod to prevent the stem from being separated from the crown tube; and a crown comprising:

the stem, wherein at least a part of the stem extends through the through hole and through the inner cavity, and wherein the stem comprises a first end adjacent to the guide rod and comprises a second end;

a knob located on the second end; and a spring structure located between the crown tube and the stem, wherein the spring structure comprises an annular spring comprising:

an annular support part; and an opening part disposed on the annular support part and comprising a plurality of annularly arranged elastic parts, wherein any two adjacent elastic parts are spaced from each other, and wherein a middle part of each of the annularly arranged elastic parts is bent in a direction toward the stem, wherein the stem is configured to:

move in the axial direction and approach the guide rod when the knob is subject to pressure;

move in the axial direction and away from the guide rod when the knob is subject to a pulling force; and rotate and drive the guide rod to rotate when the knob is subject to a rotation force, wherein the limiting structure comprises a second side located distal from the guide rod, and wherein the spring structure is located on the second side.

20. The smartwatch of claim 19, further comprising:

a first friction gasket located between the crown tube and the knob; and a second friction gasket located between the limiting structure and the stem.

* * * * *